(12) United States Patent
Kawanami et al.

(10) Patent No.: US 10,093,020 B2
(45) Date of Patent: Oct. 9, 2018

(54) ROBOT APPARATUS AND METHOD OF CONTROLLING ROBOT APPARATUS

(71) Applicant: SONY CORPORATION, Tokyo (JP)

(72) Inventors: Yasunori Kawanami, Tokyo (JP); Toshimitsu Tsuboi, Tokyo (JP); Tsutomu Sawada, Tokyo (JP); Masakuni Nagano, Chiba (JP); Akinori Kamoda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 324 days.

(21) Appl. No.: 14/961,128

(22) Filed: Dec. 7, 2015

(65) Prior Publication Data

US 2016/0082590 A1 Mar. 24, 2016

Related U.S. Application Data

(63) Continuation of application No. 13/781,877, filed on Mar. 1, 2013, now Pat. No. 9,205,559.

(30) Foreign Application Priority Data

Mar. 9, 2013 (JP) ................................ 2012-053108

(51) Int. Cl.
*B25J 9/00* (2006.01)
*B25J 9/16* (2006.01)
*G06K 9/00* (2006.01)

(52) U.S. Cl.
CPC .......... *B25J 9/1612* (2013.01); *B25J 9/1669* (2013.01); *B25J 9/1697* (2013.01); *G06K 9/00664* (2013.01); *G05B 2219/37567* (2013.01); *G05B 2219/39536* (2013.01); *G05B 2219/40298* (2013.01); *G05B 2219/45108* (2013.01); *Y10S 901/02* (2013.01); *Y10S 901/09* (2013.01)

(58) Field of Classification Search
CPC ...... B25J 9/1612; B25J 9/1669; B25J 9/1697; G06K 9/00664; G05B 2219/37567; G05B 2219/39536; G05B 2219/40298; G05B 2219/45108; Y10S 901/02; Y10S 901/09
See application file for complete search history.

(56) References Cited

U.S. PATENT DOCUMENTS 7,706,918 B2 * 4/2010 Sato ....................... B25J 9/1612
                                                       318/568.1
7,822,508 B2 * 10/2010 Sugiyama .............. B25J 9/1612
                                                       318/568.12

(Continued)

OTHER PUBLICATIONS

"Advanced Grasp Planning for Handover Operation Between Human and Robot: Three Handover Methods in Esteem Etiquettes Using Dual Arms and Hands of Home-Service Robot". Kim, Jinsul; Park, Jihwan; Hwang, Yong K.; Lee, Manjai. 2nd International Conference on autonomous Robots and Agents. Dec. 13-15, 2004.*

*Primary Examiner* — Nicholas Kiswanto
(74) *Attorney, Agent, or Firm* — Chip Law Group

(57) ABSTRACT

A robot apparatus includes: a grasping section configured to grasp an object; a recognition section configured to recognize a graspable part and a handing-over area part of the object; a grasp planning section configured to plan a path of the grasping section for handing over the object to a recipient by the handing-over area part; and a grasp control section configured to control grasp operation of the object by the grasping section in accordance with the planned path.

13 Claims, 15 Drawing Sheets

(56) References Cited

U.S. PATENT DOCUMENTS

| | | | | |
|---|---|---|---|---|
| 8,660,685 B2* | 2/2014 | Irie | ............ | B25J 9/1687 |
| | | | | 414/730 |
| 8,725,296 B2* | 5/2014 | Nagasaka | ............ | B25J 9/1612 |
| | | | | 700/219 |
| 8,855,814 B2* | 10/2014 | Kim | ............ | B25J 9/1669 |
| | | | | 294/106 |
| 8,862,267 B2* | 10/2014 | Aoba | ............ | B25J 9/1612 |
| | | | | 700/245 |
| 9,586,321 B2* | 3/2017 | Maruyama | ............ | B25J 9/1697 |

* cited by examiner

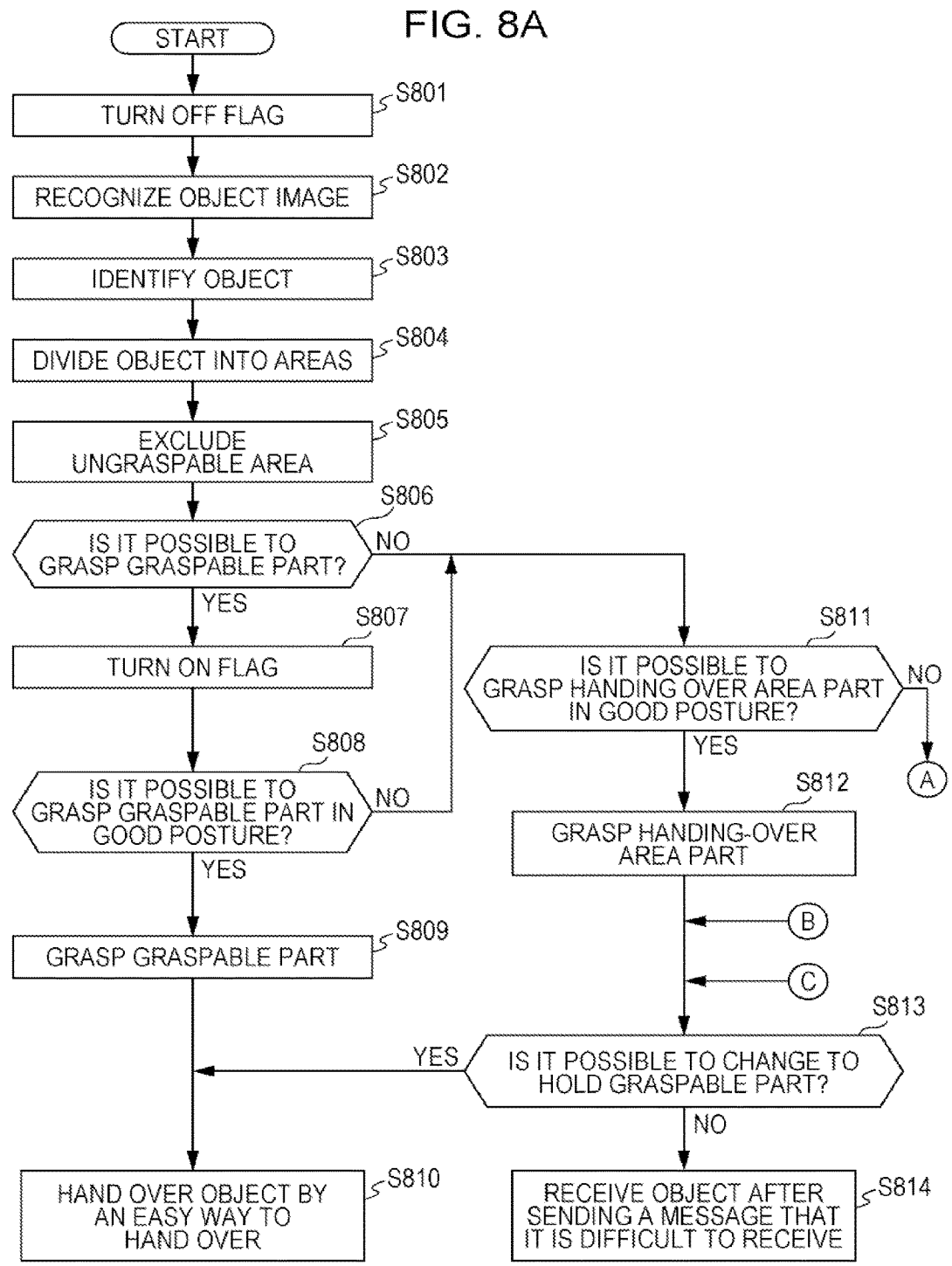

ROBOT APPARATUS AND METHOD OF CONTROLLING ROBOT APPARATUS

BACKGROUND

The technique disclosed in this specification relates to a robot apparatus, a method of controlling the same, and a computer program, which is engaged in activities in user's daily life in order to perform life support, such as household chores, welfare services, nursing care, assistance services, etc., for example. In particular, the technique relates to a robot apparatus, a method of controlling the same, and a computer program, which performs handing-over interaction of an object with a user.

To date, robot apparatuses that are designed to carry out fixed tasks and installed in factories, etc., have been widespread. However, in recent years, robot apparatuses capable of performing various kinds of work are being realized. A robot apparatus in the latter case is applied to various fields, such as welfare services, nursing care, assistance services, for example, and brings a desired object for a physically handicapped person, etc., in order to hand over the object to the person.

However, even if a robot apparatus grasps an object in an easy way to receive (or an easy posture of an object to receive), and tries to hand over the object, a recipient user sometimes finds it difficult to receive the object. Also, there are cases where an object to be handed over involves danger if handed over inadvertently, such as in the case of a cutting tool, a cup of hot drink, etc.

For example, proposals have been made on a method and apparatus for handing over goods, in which an easy way for a robot to receive goods is presented to a person, and the goods are handed over from the person to the robot by an easy way without using a visual device (for example, refer to Japanese Unexamined Patent Application Publication No. 2007-21588). Also proposals have been made on a robot grasp control apparatus which controls a robot arm so as to receive goods from a person (for example, refer to Japanese Unexamined Patent Application Publication No. 2005-219161). On the contrary, no proposal has been made on the point of handing over goods from a robot to a person. Also, in this method for handing over goods, it is necessary to attach a wireless tag to the target goods, and further, it is necessary to get the goods closer to or contacted a reading device to check a positional relationship, and to display the relationship to a person, and then to hand over the goods at an instructed position by the person. Accordingly, in order to achieve handing over of goods, it becomes necessary to implement various devices and procedures, and thus it is thought that applicable cases are limited.

Also, a proposal has been made on a technique for modeling daily commodities in consideration of comfortability of a recipient at the time of grasping and handing over (for example, refer to Yamanobe, et al., "Grasping of daily commodities in consideration of comfortability of recipient at the time of handing over", (the 29th Annual Conference of the Robotics Society of Japan (Sep. 7 to 9, 2011))). In this technique, descriptions have been given that information for each primitive, such as an operation section, a holding section, etc., of a daily commodity, such as a mug, etc., is described in a structure description language format, a priority of each primitive is determined for selecting a primitive, and a plan of a grasping position and posture should be made after determining a position of an object in consideration of influence given to the recipient. However, there has not been any specific disclosure on a method of making a grasping plan.

SUMMARY

It is desirable to provide an excellent robot apparatus, a method of controlling the robot apparatus, and a computer program, which is capable of performing handing-over interaction of an object with a user without imposing excessive load on the user and without endangering the user.

According to an embodiment of the present disclosure, there is provided a robot apparatus including: a grasping section configured to grasp an object; a recognition section configured to recognize a graspable part and a handing-over area part of the object; a grasp planning section configured to plan a path of the grasping section for handing over the object to a recipient by the handing-over area part; and a grasp control section configured to control grasp operation of the object by the grasping section in accordance with the planned path.

In the above-described embodiment, the robot apparatus may further include an imaging section, wherein the recognition section configured to recognize the graspable part and the handing-over area part of the object on the basis of an image recognition result of a captured image of the object by the imaging section.

In the above-described embodiment, the recognition section may be configured to recognize a part enabling a user who receives the object to easily receive the object as the handing-over area part, and recognize a part allowed to be grasped by the grasping section, but difficult for the user to receive as the graspable part on the basis of an image recognition result of a captured image of the object by the imaging section.

In the above-described embodiment, the recognition section may be configured to further recognize a part of the object not allowed to be held by the grasping section as an ungraspable part.

In the above-described embodiment, the grasp planning section may be configured to plan a path of the grasping section for handing over by grasping the object by the graspable part, and handing over the object by the handing-over area part.

In the above-described embodiment, if the grasp planning section fails to plan a path of the grasping section for handing over the graspable part of the object in a good posture, the grasp planning section may be configured to plan a path of the grasping section for changing to hold the graspable part of the object in a good posture, and then to hand over the object to the recipient by the handing-over area part.

In the above-described embodiment, if the grasp planning section fails to plan a path of the grasping section for handing over the graspable part of the object in a good posture, the grasp planning section may be configured to plan a path of the grasping section for grasping the object by the handing-over area part, and then changing to hold the graspable part of the object in a good posture, and then handing over the object by the handing-over area part.

In the above-described embodiment, if the grasp planning section fails to grasp the graspable part of the object in a good posture, the grasp planning section may be configured to plan a path of the grasping section for grasping the object by the handing-over area part, and handing over the object to the recipient by the graspable part.

In the above-described embodiment, when the grasp planning section fails to grasp the graspable part of the object in a good posture even if changing to hold the object, the grasp planning section may be configured to plan a path of the grasping section for grasping the object by the handing-over area part, and handing over the object to the recipient by the graspable part.

In the above-described embodiment, the grasp planning section may be configured to give a warning to the recipient to whom the object is handed over by the graspable part.

In the above-described embodiment, if the grasp planning section fails to plan a path of the grasping section for handing over the object either by the handing-over area part or by the graspable part, the grasp planning section may be configured to give a warning of being unable to hand over the object to the recipient.

According to an embodiment of the present disclosure, there is provided a method of controlling a robot apparatus, including: recognizing a graspable part and a handing-over area part of an object to be grasped by a grasping section; grasp planning a path of the grasping section for handing over the object to a recipient by the handing-over area part; and controlling grasp operation of the object by the grasping section in accordance with the planned path.

According to an embodiment of the present disclosure, there is provided a computer program described in a computer-readable format for causing a computer to function as an apparatus including: a recognition section configured to recognize a graspable part and a handing-over area part of an object to be grasped by a grasping section; a grasp planning section configured to plan a path of the grasping section for handing over the object to a recipient by the handing-over area part; and a grasp control section configured to control grasp operation of the object by the grasping section in accordance with the planned path.

The computer program described above is a computer program defined in a computer-readable format such that predetermined processing is achieved on a computer. To put it in another way, by installing the above-described computer program on a computer, cooperative operation is performed on the computer. Accordingly, it is possible to obtain a same working effect as that of the robot apparatus described above.

By the technique disclosed in this specification, it is possible to provide an excellent robot apparatus, a method of controlling the robot apparatus, and a computer program, which is capable of performing handing-over interaction of an object with a user without imposing excessive load on the user and without endangering the user.

By the technique disclosed in this specification, it is possible to achieve object handing-over interaction from a robot apparatus to a person safely and efficiently in consideration of easiness of receiving by a recipient of the object.

Also, by the technique disclosed in this specification, if determined that it is difficult to hand over an object, it is possible for the robot apparatus to inform a recipient of that in advance so as to reduce uncomfortable feeling given to the recipient.

Also, by the technique disclosed in this specification, it is possible to achieve handing-over interaction between a robot apparatus and a person at a low cost without using a device, such as a wireless tag, a reading device, etc.

The other objects, features, and advantages of the technique disclosed in this specification will further become apparent by a detailed description based on an embodiment described below and accompanying drawings.

BRIEF DESCRIPTION OF THE DRAWINGS

FIG. 8A is a flowchart illustrating a processing procedure in order for the robot apparatus to hand over an object;

DETAILED DESCRIPTION OF EMBODIMENTS

In the following, a detailed description will be given of an embodiment of the technique disclosed in this specification with reference to the drawings.

Figure 1:
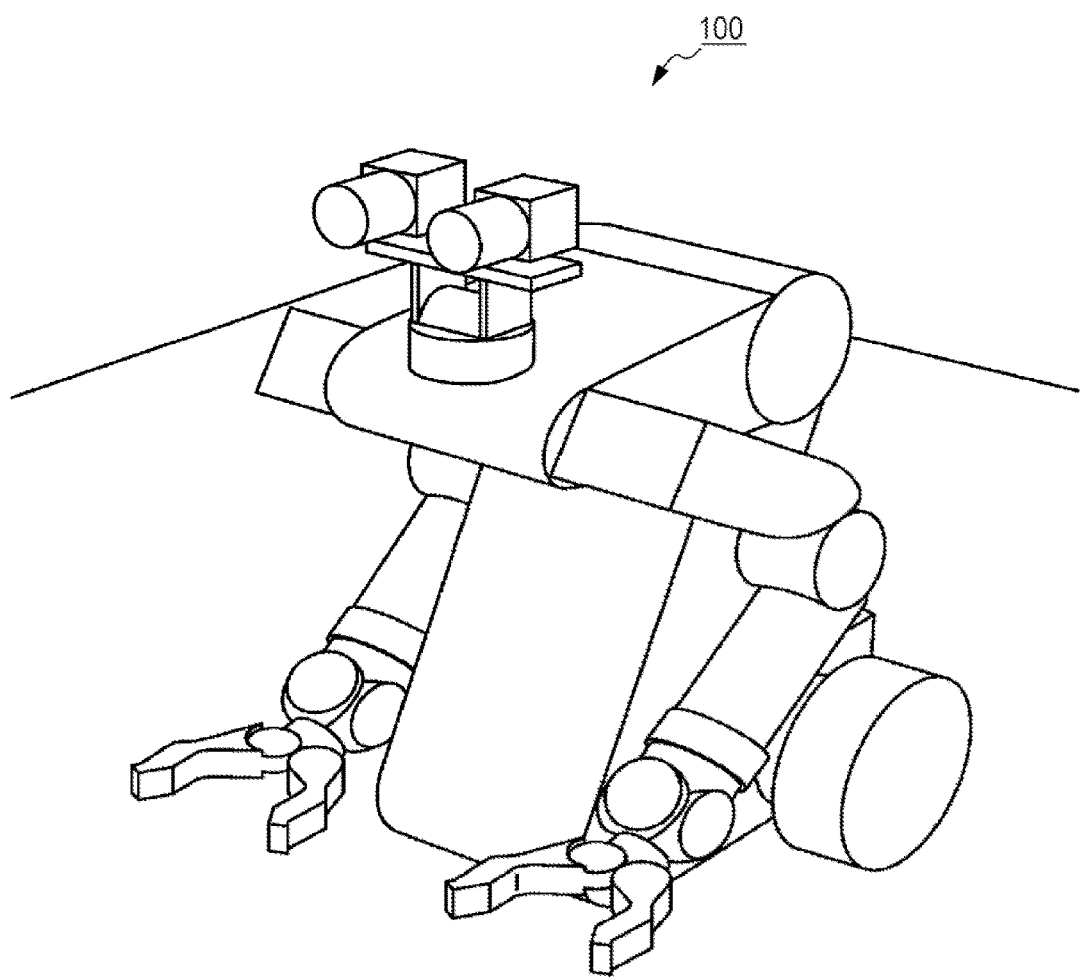
FIG. 1 is a diagram illustrating an outer view of a robot apparatus to which a technique disclosed in this specification can be applied.
Figure 2:
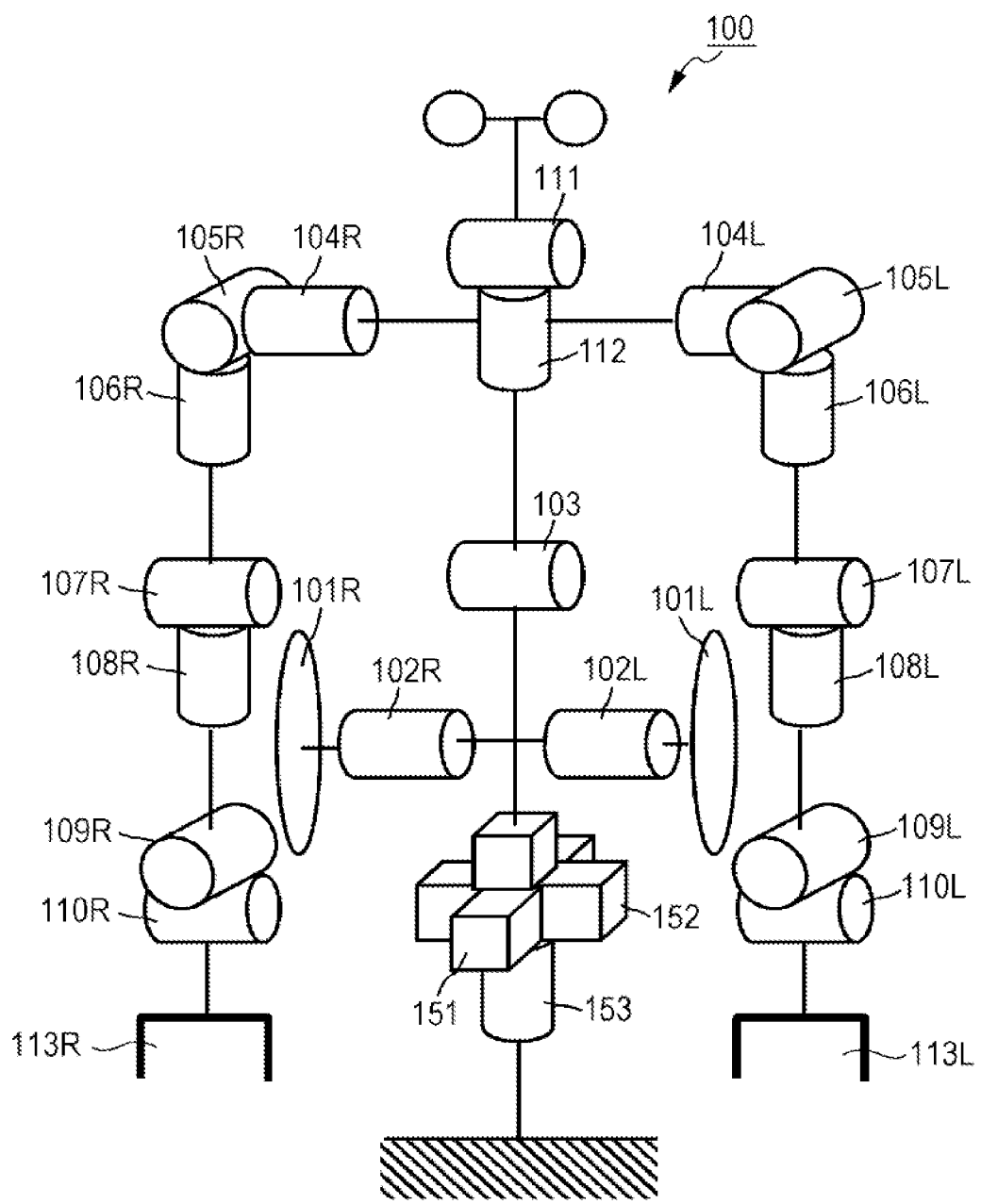
FIG. 2 is a diagram schematically illustrating a configuration of degrees of freedom in joints of the robot apparatus to which a technique disclosed in this specification can be applied.

FIG. 1 illustrates an outer view of a robot apparatus 100 to which the technique disclosed in this specification can be applied. The robot apparatus 100 has a link structure in which a plurality of links are connected by joints, and the individual joints are operated by actuators, respectively. Also, FIG. 2 schematically illustrates a configuration of degrees of freedom in joints of the robot apparatus 100. The robot apparatus 100 illustrated in FIG. 1 and FIG. 2 is installed in a surrounding environment that is dynamically changing every moment, such as in a home, etc., and performs life support, such as household chores, nursing care, etc. However, it is also possible for the robot apparatus 100 to be installed in a factory, etc., and to carry out a fixed task.

The robot apparatus 100 illustrated in FIG. 1 and FIG. 2 is a dual-arm type, and is provided with two driving wheels 101R and 101L that are opposed to each other in a base section as a moving means. The driving wheels 101R and 101L are driven by driving wheel actuators 102R and 102L that individually rotate around a pitch axis, respectively. In this regard, in FIG. 2, reference numerals 151, 152, 153 are underactuated joints that do not actually exist, and correspond to a translational degree of freedom in an X direction (forward and backward directions), a translational degree of freedom in a Y direction (right and left directions), and a rotational degree of freedom around a yaw axis, respectively, of the robot apparatus 100 with respect to a floor face, thereby representing movement of the robot apparatus 100 in a virtual world.

The moving means is connected to an upper body through a waist joint. The moving means is driven by a waist-joint pitch axis actuator 103 that rotates around a pitch axis. The upper body includes two, right and left, arm sections and a head section connected through a neck joint. Each of the right and the left arm sections has three degrees of freedom at the shoulder joint, two degrees of freedom at an elbow joint, and two degrees of freedom at a wrist joint, and thus seven degrees of freedom in total. The three degrees of freedom at a shoulder joint are driven by shoulder-joint pitch axis actuators 104R/L, shoulder-joint roll axis actuators 105R/L, and shoulder-joint yaw axis actuators 106R/L. The two degrees of freedom at the elbow joint are driven by elbow-joint pitch axis actuators 107R/L and elbow-joint yaw axis actuators 108R/L. The two degrees of freedom at the wrist joint are driven by wrist-joint roll axis actuators 109R/L and wrist-joint pitch axis actuators 110R/L. Also, the two degrees of freedom at the neck joint are driven by a neck-joint pitch axis actuator 111 and a neck-joint roll axis actuator 112. Also, one degree of freedom at a hand joint at an end of right or left arm section is driven by a corresponding one of hand-joint roll axis actuators 113R/L. In the present disclosure, it is possible to achieve grasp operation of an object with a hand by driving the hand-joint roll axis actuators 113R/L.

In this regard, although the robot apparatus 100 illustrated in FIG. 1 and FIG. 2 is provided with a moving means having opposed two wheels, the gist of the technique disclosed in this specification is not limited to a moving means having opposed two wheels. For example, it is also possible to apply the technique disclosed in this specification in the same manner to a robot apparatus provided with a moving means having legs, or a robot apparatus provided without a moving means.

An encoder for measuring a joint angle, a motor for generating torque, a current-controlled type motor driver for driving the motor, and a reduction gear for obtaining sufficient generated force are attached to an actuator of each axis. Also, each actuator is provided with a microcomputer that performs drive control of the actuator (both are not illustrated in FIG. 2).

Dynamics computing of the robot apparatus 100 is performed on a host computer (not illustrated in the figure), for example, and control target values of torque or joint angles of the individual actuators are generated. The control target values are transmitted to the control microcomputer provided to the actuators, and used for controlling the actuators performed by the control microcomputers, respectively. Also, the individual joint actuators are controlled by a force control method or a position control method.

Figure 3:
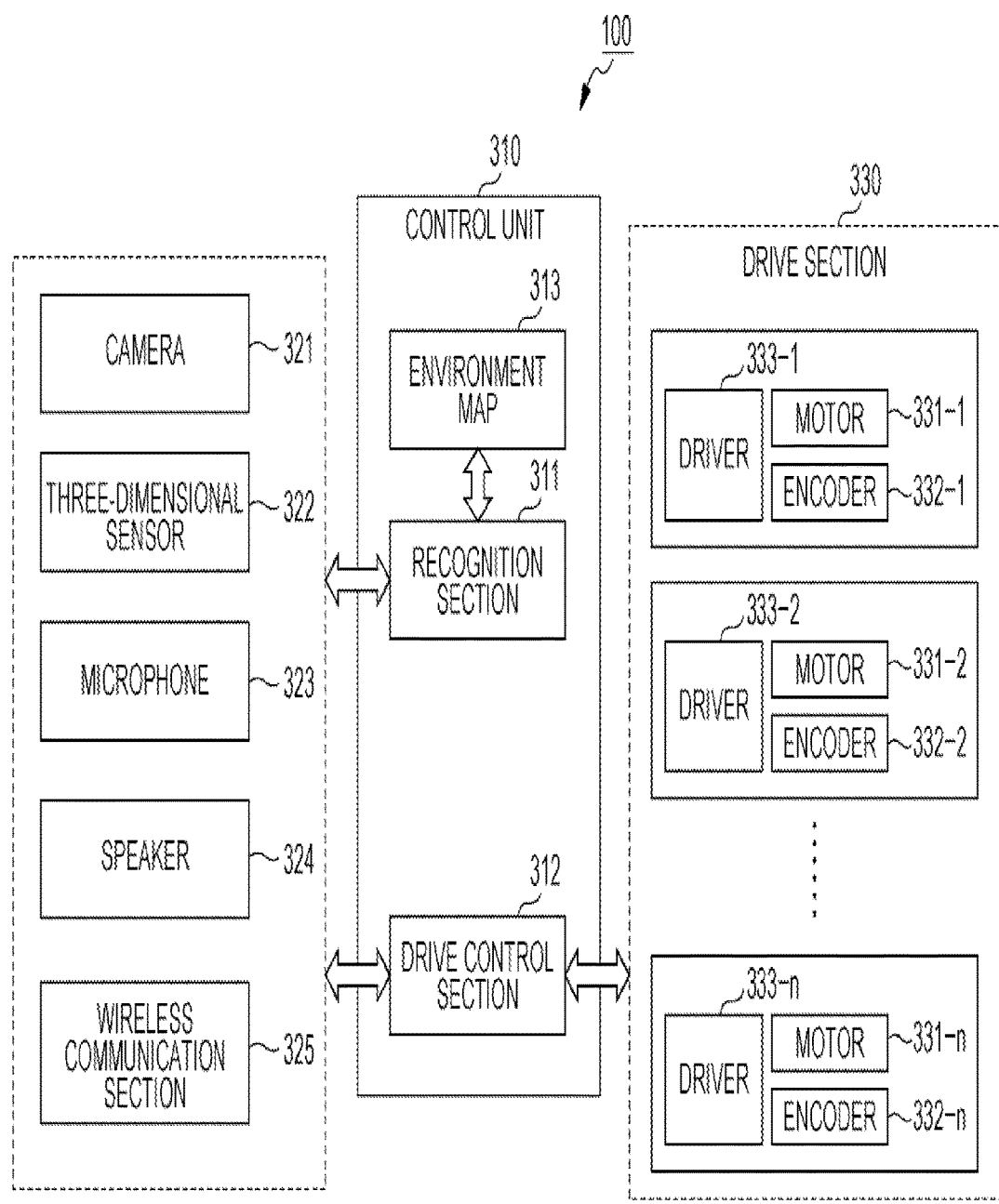
FIG. 3 is a diagram schematically illustrating a configuration of a control system of the robot apparatus illustrated in FIG. 1.

FIG. 3 schematically illustrates a functional configuration for controlling the robot apparatus 100 illustrated in FIG. 1. The robot apparatus 100 includes a control unit 310, which performs overall control of entire operation and the other data processing, an input/output section 320, and a drive section 330. In the following, descriptions will be given of the individual sections.

The input/output section 320 includes, as an input section, a camera 321 and a three-dimensional sensor 322 corresponding to eyes of the robot apparatus 100 and a microphone 323 corresponding to ears of the robot apparatus 100, etc. Also, the input/output section 320 includes, as an output section, a speaker 324 corresponding to a mouth of the robot apparatus 100, etc. Here, the camera 321 includes an image sensing device, such as a CCD (Charge Coupled Device) or a CMOS (Complementary Metal Oxide Semiconductor), etc. Also, the three-dimensional sensor 322 is a device capable of measuring a three dimensional position and posture of an object, and includes, for example, a stereo camera, a laser range finder, Kinect (registered trademark), etc. Also, the robot apparatus 100 is allowed to receive an instruction of a task, for example, by audio input of a user from the microphone 323. However, the robot apparatus 100 may include an input means (not illustrated in the figure) of an instruction of the other tasks through a wired connection, a wireless connection, or through a recording medium, etc.

Also, the input/output section 320 includes a wireless communication section 325. The robot apparatus 100 is allowed to perform data communication with a user's instruction terminal (a tablet terminal, etc., not illustrated in FIG. 3), etc., by the wireless communication section 325 through a communication path, such as Wi-Fi, etc.

The drive section 330 is a functional module for achieving degrees of freedom at each joint of the robot apparatus 100, and includes a plurality of drive units disposed for each axis, such as a roll axis, a pitch axis, and a yaw axis, etc., at the individual joints. Each of the drive units includes a combination of a motor 331 performing rotational operation around a predetermined axis, an encoder 332 detecting a rotational position of the motor 331, and a driver 333 adaptively controlling a rotational position and a rotational velocity of the motor 331 on the basis of an output of the velocity encoder 332.

The control unit 310 includes a recognition section 311, a drive control section 312, and an environment map 313.

The recognition section 311 recognizes a surrounding environment on the basis of information obtained from the input section, such as the camera 321 and the range sensor 322 in the input/output section 320. For example, the recognition section 311 builds and updates the environment map 313 in advance on the basis of position and posture information of the camera 321 that is obtained by own-position estimation processing estimating a position of the camera 321, and object information that is obtained by image recognition processing detecting an object from a captured image of the camera 321.

The drive control section 312 controls the output section out of the input/output section 320, and driving of the drive section 330. For example, the drive control section 312 performs control of the drive section 330 in order for the robot apparatus 100 to achieve tasks. The tasks achieved by the robot apparatus 100, mentioned here, include physical interaction with a user, such as handing over of an object instructed by the user, etc. In order to achieve the interaction, the robot apparatus 100 drives the driving wheel actuators 102R and 102L, and the individual joint actuators of an arm section.

The robot apparatus 100 is applied to, for example, life support, and brings a desired object for a physically handicapped person, etc., in order to hand over the object to the person. However, even if a robot apparatus grasps an object in an easy way to receive (or an easy posture of an object to receive), and tries to hand over the object, a recipient user sometimes finds it difficult to receive the object. Thus, in this embodiment, object handing-over interaction from the robot apparatus 100 to a person is made safe and efficient in consideration of easiness of receiving by a recipient of the object. Also, if determined that it is difficult to hand over the object, the robot apparatus 100 informs the recipient of the difficulty in advance so as to reduce uncomfortable feeling given to the recipient.

In this embodiment, grasping areas of individual objects to be grasped are divided into areas of a graspable part, a handing-over area part, and an ungraspable part in consideration of easiness to receive at the time of handover. The handing-over area part is a part of the object allowed for a user who receives the object to receive easily. The graspable part is an easy part for the robot apparatus 100 to grasp, but a difficult part for the user to receive. The ungraspable part is a part that is difficult bot for the robot apparatus 100 and the user to grasp. Such area information for each object category may be put into a database.

Figure 4:
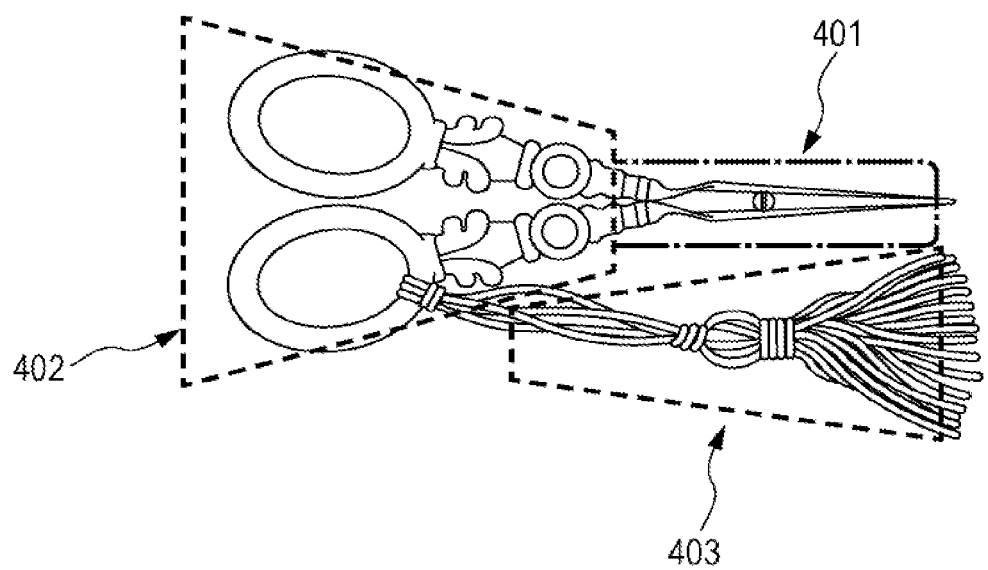
FIG. 4 is a diagram illustrating an example in which scissors are divided into areas.

FIG. 4 illustrates an example in which scissors, an example of an object to be grasped, are divided into areas of a graspable part 401, a handing-over area part 402, and an ungraspable part 403. As illustrated in the figure, a handle becomes the handing-over area part 402, a back becomes the graspable part 401, and a strap attached to the handle is flexible to be held (or it is difficult to be held in order to hold a position of the handing-over area part 402), and thus becomes the ungraspable part 403. In this regard, the other examples of the areas, which are to be handled as ungraspable parts, include an adhesive area disposed on an object surface, and an area susceptible to damage, such as a lens which is susceptible to be hurt by just being touched, for example.

Figure 5:
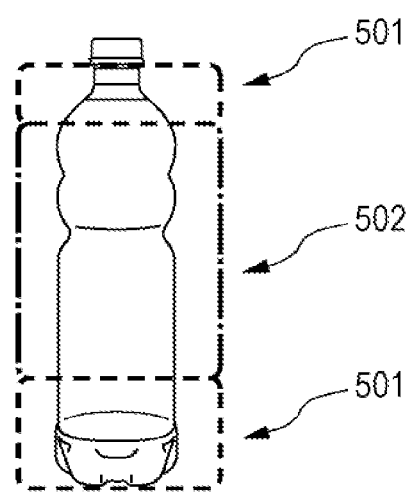
FIG. 5 is a diagram illustrating an example in which a plastic bottle is divided into areas.
Figure 6:
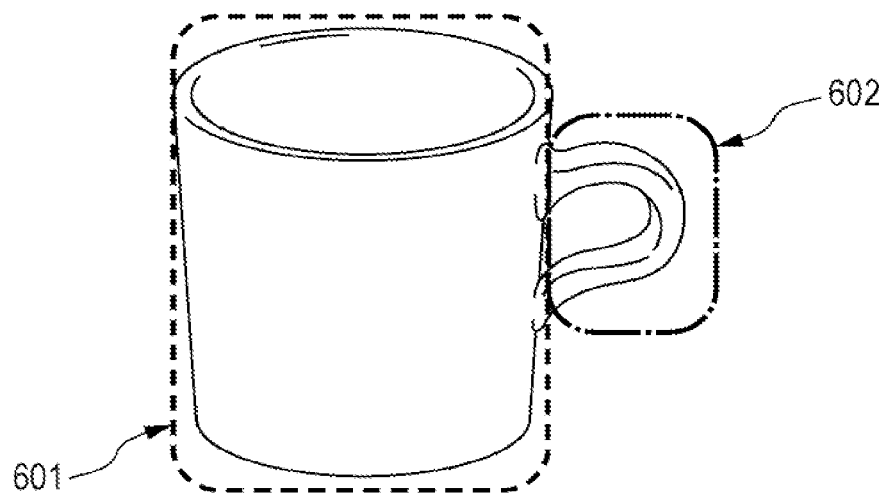
FIG. 6 is a diagram illustrating an example in which a mug is divided into areas.
Figure 7:
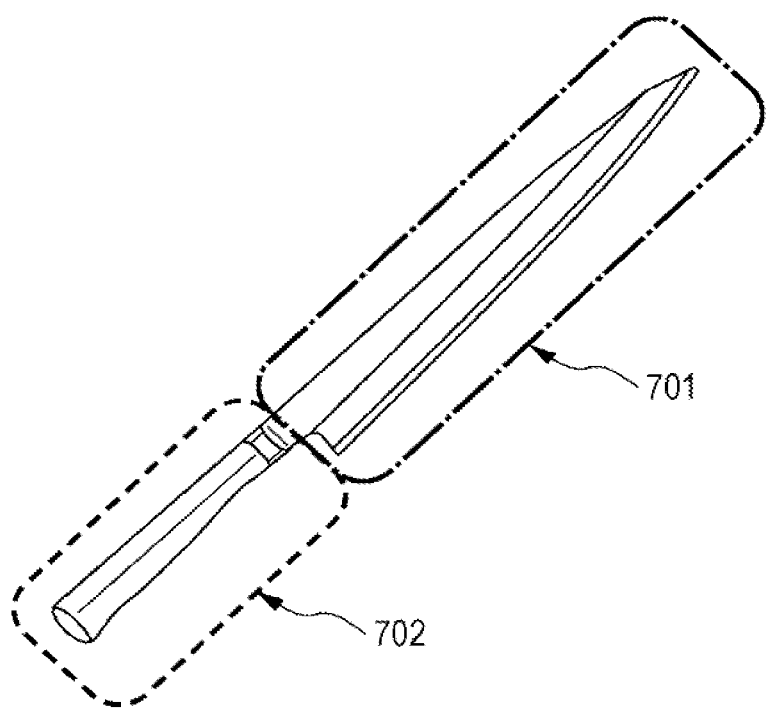
FIG. 7 is a diagram illustrating an example in which a knife is divided into areas.

Also, FIG. 5 illustrates an example in which a plastic bottle is divided into a graspable part 501 and a handing-over area part 502. As illustrated in FIG. 5, a shoulder part and a bottom part of the plastic bottle becomes the graspable part 501, and a body part in the middle of the bottle becomes a handing-over area part 502. Also, FIG. 6 illustrates an example in which a mug is divided into a graspable part 601 and a handing-over area part 602. As illustrated in FIG. 6, a cylindrical main body part of the cup becomes a graspable part 601, and a handle part becomes a handing-over area part 602. Also, FIG. 7 illustrates an example in which a knife is divided into a graspable part 701 and a handing-over area part 702. As illustrated in FIG. 7, a blade part becomes a graspable part 701, and a handle part becomes a handing-over area part 702.

If the robot apparatus 100, which hands over an object, holds the object by a graspable part, and a user, who receives the object, receives the object by a handing-over area part, it is easy for the user to receive, and thus it is efficient and safe work. However, if it is difficult for the robot apparatus 100 to grasp the graspable part of the object because of a shape, a position, a posture, etc., of the object, the robot apparatus 100 verifies whether it is possible to grasp the handing-over area part. And if possible, the robot apparatus 100 grasps the object by the handing-over area part in place of the graspable part.

If the robot apparatus 100 has dual arms, it is possible to change both hands to hold the object, whereas if the robot apparatus 100 has a single hand, the robot apparatus 100 may temporarily places the object, and then may change holding the object. If the robot apparatus 100 has grasped an object to hand over by a handing-over area part, the robot apparatus 100 verifies whether it is possible to change holding from a handing-over area part to a graspable part. And if possible, the robot apparatus 100 changes to hold a graspable part in a good posture, and then hands over the object to a recipient. Also, if it is difficult to change holding the object, the robot apparatus 100 sends a message that it is difficult to hand over to the user, and tries to hand over the object by the handing-over area part in a good posture, or to hand over the object by the graspable part to the user. Further, if it is not possible for the robot apparatus 100 to grasp the object by the handing-over area part, the robot apparatus 100 sends a message that it is not possible to grasp, or to hand over to the user.

In this regard, the "user" mentioned here corresponds to a "receiving side", and includes a receiving robot, etc., in addition to the case of a receiving person.

Also, it is possible to send a message to the user, for example, by outputting a voice message from the speaker 324, but it is also possible to inform the user by another way instead.

Figure 19:
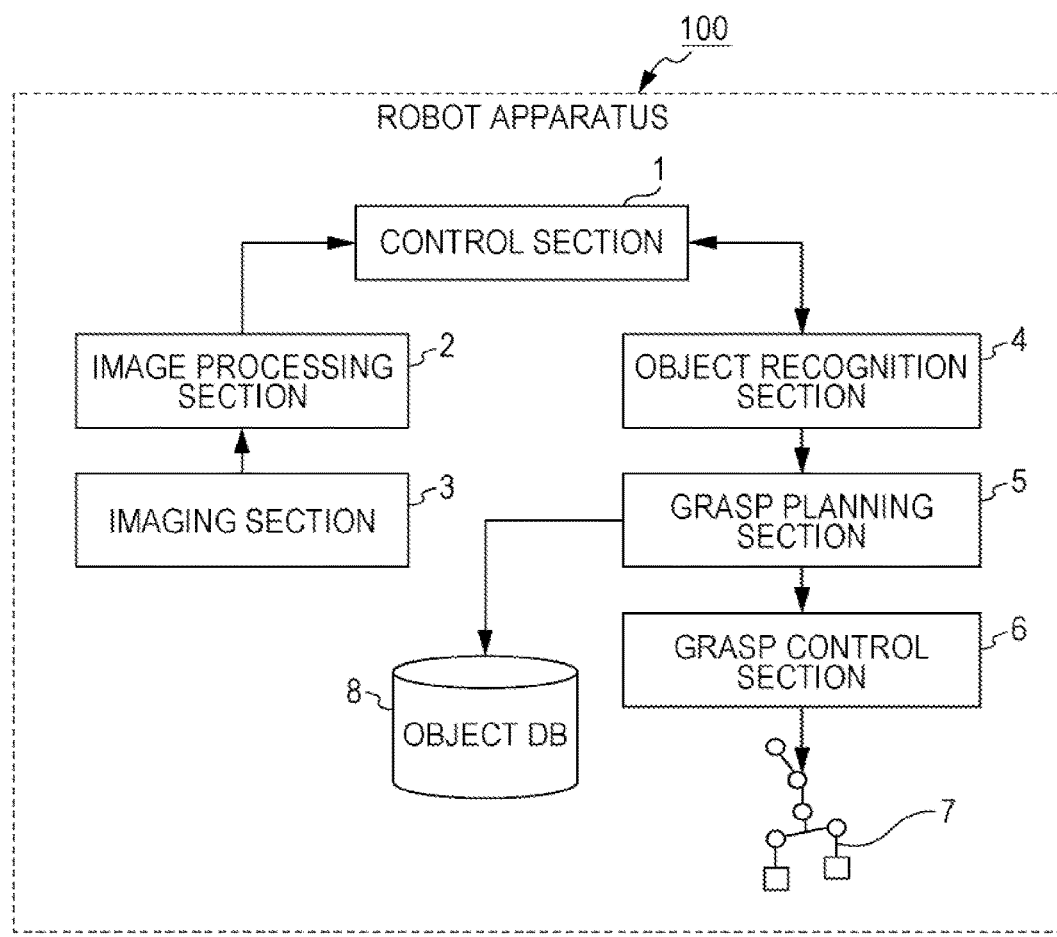
FIG. 19 is a flowchart illustrating a functional configuration of the robot apparatus that hands over an object to a user.

FIG. 19 illustrates a functional configuration of the robot apparatus 100 that hands over an object to a user. The robot apparatus 100 illustrated in FIG. 19 includes a control section 1, an image processing section 2, an imaging section 3, an object recognition section 4, a grasp planning section 5, a grasp control section 6, and a grasping section 7.

The control section 1, the image processing section 2, the object recognition section 4, the grasp planning section 5, and the grasp control section 6 correspond to the control unit 310 in FIG. 3. The control section 1 totally controls the overall operation of the robot apparatus 100. The image processing section 2 and the object recognition section 4 correspond to the recognition section 311, and the grasp planning section 4 and the grasp control section 5 correspond to the drive control section 312. Also, the imaging section 3 corresponds to the camera 321, and the grasping section 7 mainly includes dual arms of the robot apparatus 100.

The imaging section 3 captures an image of an object to be handed over to the user, and a palm of the user who is a handing-over recipient, etc. The image processing section 2 performs image processing on the captured image by the imaging section 3.

The object recognition section 4 recognizes an object to be handed over to the user from an image processing result of the captured image, and divides the object into a graspable part, a handing-over area part, and an ungraspable part, etc. Also, the object recognition section 4 gives grasping coordinate systems Σobj1 and Σobj2 (described later) to the graspable part and the handing-over area part, respectively. Also, the object recognition section 4 recognizes a palm of the user who is a recipient of the object from the image processing result of the captured image, and gives a handing-over coordinate system Σhd (described later). When the object recognition section 4 performs processing to divide an area and to give the coordinate system as described above, the object recognition section 4 may refer to an object database 8. The database 8 stores area information for each object category, original points and posture of the grasping coordinate systems given to the individual areas, ranges of areas, hand-over vectors (described later), etc.

The grasp planning section 5 makes a path plan of a position and posture of the grasping section 7 for handing over the object to the user on the basis of a recognition result, such as the object and a palm of user's hand, etc., by the object recognition section 4.

The grasp planning section 5 plans a path of a position and posture of the grasping section 7 so as to hold the graspable part of the object basically by the grasping section 7, and hand over the object to the user by the handing-over area part of the object. However, if it is difficult to grasp the graspable part of the object by the grasping section 7 because of a shape, a position, a posture, etc., of the object, the grasp planning section 5 plans the path flexibly. For example, the grasp planning section 5 plans to temporarily hold the handing-over area part of the object, and after that, to hold the graspable part of the object instead, and to hand over the handing-over area part of the object to the user. Alternatively, the grasp planning section 5 plans to hand over the graspable part of the object to the user, etc. Also, if it is not possible for the grasp planning section 5 to plan a path of the grasping section 7, which is easy for the user to receive the object, or if it is difficult for the grasp planning section 5 to plan a path of the grasping section 7 for handing over the object in the first place, the grasp planning section 5 sends a message stating that to the user.

In this regard, any method may be employed for a method of determining a posture of the grasping section 7 at the time of grasping an object. For example, it is possible to apply a method disclosed in Japanese Patent Application No. 2011-262202 specification, which has been already assigned to the present applicant.

And the grasp control section 6 controls the operation of the grasping section 7 in accordance with the planned path to achieve handing over the object to the user. In this regard, any method may be employed for a method of controlling the operation of the grasping section 7 in accordance with the determined grasp posture. For example, it is possible to apply a method disclosed in Japanese Patent Application No. 2011-262202 specification, which has been already assigned to the present applicant.

Figure 8B:
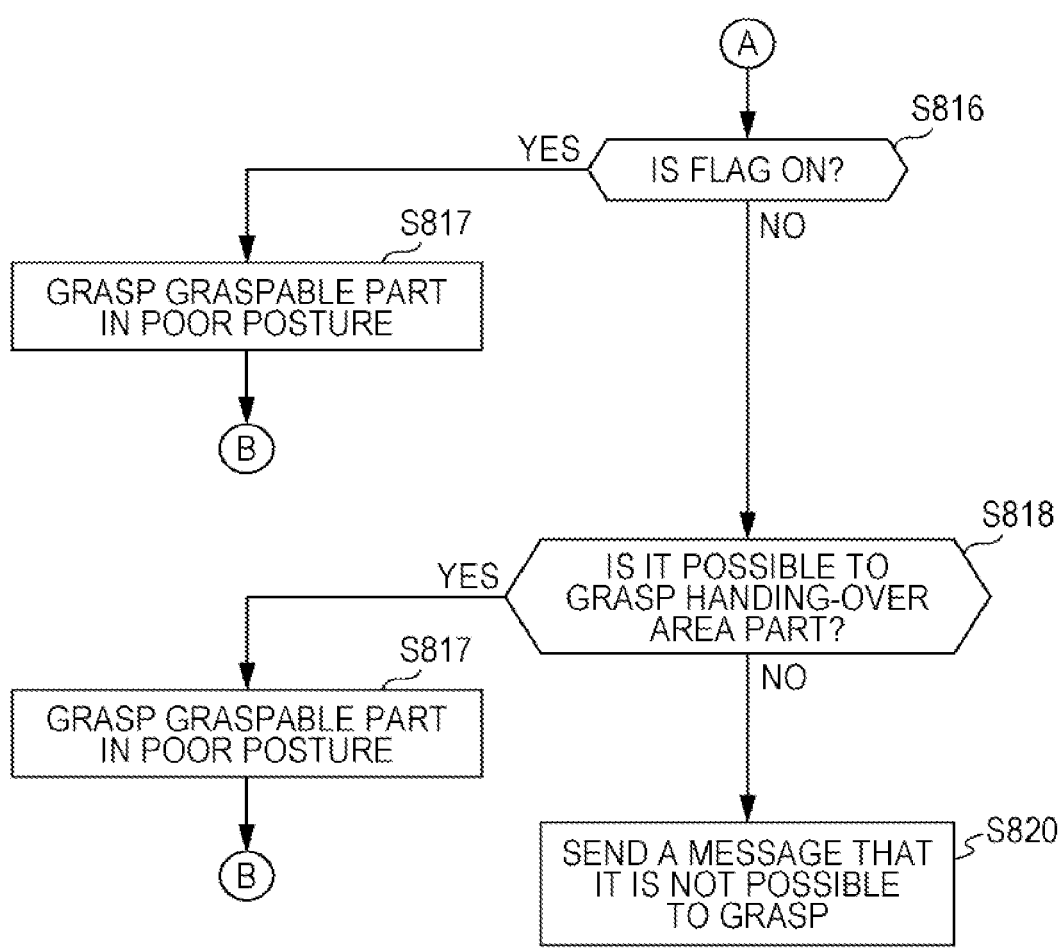
FIG. 8B is a flowchart illustrating a processing procedure in order for the robot apparatus to hand over an object.

FIG. 8A and FIG. 8B illustrate a processing procedure for the robot apparatus 100 to hand over an object in a format of a flowchart.

First, a flag indicating that an object is grasped by a graspable part is turned off (step S801).

Next, an image of an object to be handed over is recognized in the captured image of the camera 321 (step S802), and the object is identified (step S803).

Next, an area of the object included in the captured image is divided into a graspable part, a handing-over area part, and an ungraspable part (step S804), and the ungraspable part is excluded from the target of grasp (step S805).

Next, whether it is possible to grasp this object by the graspable part or not is verified from the shape of the object identified by step S803, and the current position and posture of the object (step S806).

Here, if it is possible to grasp the object to be handed over by the graspable part (Yes in step S806), the flag indicating that the object is grasped by the graspable part is turned on (step S807), and it is further determined whether it is possible for the robot apparatus 100 to grasp the graspable part of the object in a good posture or not (step S808).

And if it is possible to grasp the object by the graspable part in a good posture (Yes in step S808), the robot apparatus 100 grasps the object by the graspable part (step S809), and hands over the object in an easy way for the user to receive (step S810).

On the other hand, if it is not possible for the robot apparatus 100 to grasp the object to be handed over by the graspable part (No in step S806), and it is not possible to grasp the object by the graspable part in a good posture (No in step S808), a determination is made of whether it is possible to grasp the object by the handing-over area part in place of the graspable part in a good posture or not (step S811).

If it is possible to grasp the handing-over area part of the object in a good posture (Yes in step S811), the robot apparatus 100 grasps the object by the handing-over area part for the time being (step S812). After that, a determination is made of whether it is possible for the robot apparatus 100 to change to hold the object by the graspable part in a good posture (step S813).

If it is possible for the robot apparatus 100 to change to hold the object by the graspable part in a good posture (Yes in step S813), the robot apparatus 100 changes to hold the object by the graspable part in a good posture (step S814), and then to hand over the object to the user in an easy way to receive (step S810).

Also, if it is not possible for the robot apparatus 100 to change to hold the object by the graspable part in a good posture (No in step S813), the robot apparatus 100 sends a message to the user that it is difficult to hand over the object, and then carries out the handing-over of the object (step S815).

Also, if it is not possible for the robot apparatus 100 to grasp the handing-over area part of the object in a good posture (No in step S811), a determination is made of whether the flag is set on or not (step S816).

Here, a state of the flag being on (Yes in step S816) indicates that it is possible to currently grasp the graspable part of the object in an incorrect posture, and thus the robot apparatus 100 grasps the graspable part of the object in the incorrect posture (step S817). After that, the robot apparatus 100 determines whether it is possible to change to hold the object by the graspable part in a good posture (step S813). If it is possible to change to hold the object by the graspable part (Yes in step S813), the robot apparatus 100 changes to hold the object by the graspable part in a good posture (step S814), and hands over the object to the user in an easy way to hand over (step S810). Also, if it is not possible for the robot apparatus 100 to change to hold the object by the graspable part in a good posture (No in step S813), the robot apparatus 100 sends a message to the user that it is difficult to hand over the object, and carries out the handing-over of the object (step S815).

Also, a state of the flag not being on (No in step S816), indicates that it is not possible for the robot apparatus 100 to grasp the graspable part of the object (even in an incorrect posture), and that it is not possible to grasp the handing-over area part in a good posture. In this case, a determination is made of whether it is possible for the robot apparatus 100 to grasp the handing-over area part of the object (if not in a good posture) (step S818).

If it is possible for the robot apparatus 100 to grasp the handing-over area part of the object (if not in a good posture) (Yes in step S818), the robot apparatus 100 grasps the handing-over area part of the object for the time being (step S819). After that, a determination is made of whether it is possible for the robot apparatus 100 to change to hold the object by the graspable part in a good posture (step S813). And if it is possible for the robot apparatus 100 to change to hold the object by the graspable part in a good posture (Yes in step S813), the robot apparatus 100 changes to hold the object by the graspable part in a good posture (step S814), and then hands over the object to the user in an easy way to hand over (step S810). Also, if it is not possible for the robot apparatus 100 to change to hold the object by the graspable part in a good posture (No in step S813), the robot apparatus 100 sends a message to the user that it is difficult to hand over the object, and then carries out the handing-over of the object (step S815).

Also, if it is not possible for the robot apparatus 100 to grasp the object either by the graspable part or by the handing-over area part (No in step S818), the robot apparatus 100 sends a message that it is not possible to grasp the object (step S820), and then terminates this processing.

In this regard, if the robot apparatus 100 includes two arms as in this embodiment (or three arms or more), it is possible to change to hold the object using both hands in the case of dual arms. Also, in the case of a robot apparatus with a single arm, it is possible to temporarily place the object by one hand, and then to change holding.

Figure 9:
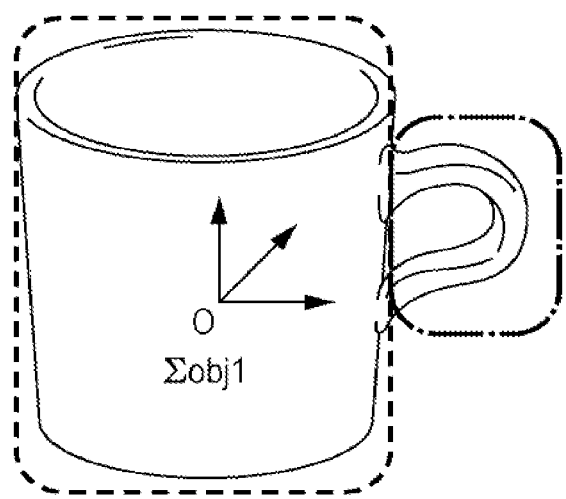
FIG. 9 is a diagram illustrating a state in which a grasp object coordinate system Σobj1 is given to a graspable part of a mug, which is an object to be grasped.

FIG. 9 illustrates a state in which a grasp object coordinate system Σobj1 is given to a graspable part of a mug, which is an object to be grasped. The grasp object coordinate system Σobj1 is positioned at a center point of the object, and represents a good posture when the object is handed over to the user.

Figure 10:
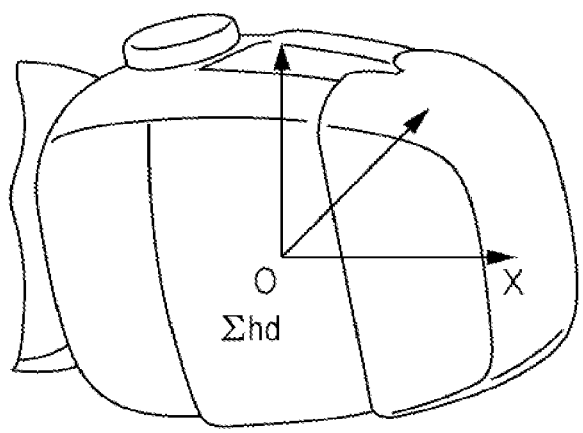
FIG. 10 is a diagram illustrating a state in which a grasping coordinate system Σhd is given to a grasping section used by the robot apparatus for grasping an object.

Also, FIG. 10 illustrates a state in which a grasping coordinate system Σhd is given to a grasping section used by the robot apparatus 100 for grasping an object. The grasping section illustrated in FIG. 10 is just like a gripper, and a size of a graspable object is determined in accordance with a width of the gripper, etc. In FIG. 10, the grasping coordinate system Σhd is given to a grasp center point of the grasping section, and a direction in which the grasping section tries to grab the object, that is to say a hand-over direction vector X, is expressed.

Figure 11:
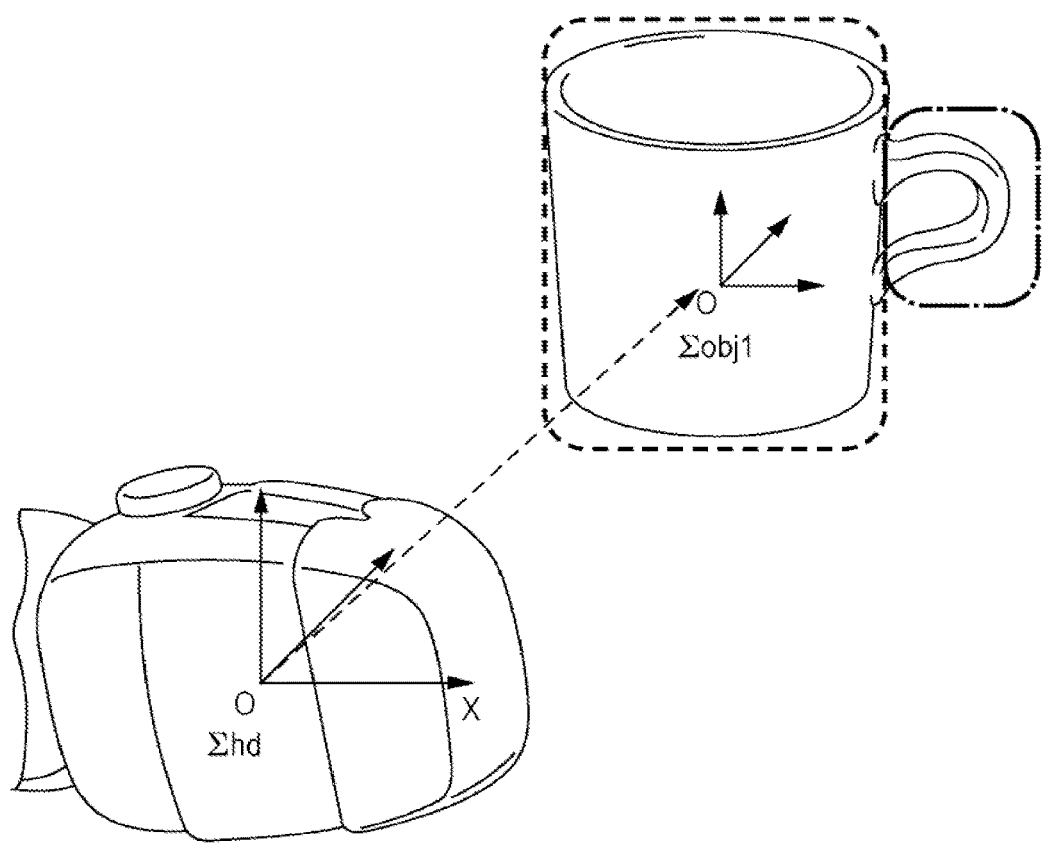
FIG. 11 is a diagram illustrating an example in which a graspable part of a mug is replaced by a primitive shape (cylinder)

When the robot apparatus 100 recognizes an image of a mug, which is an object to be grasped, from an image captured by the camera 321, the grasp object coordinate system Σobj1 is given to a center point of the graspable part of the mug as illustrated in FIG. 9. Also, in order to simplify the processing for determining whether graspable or not, the graspable part is replaced by a primitive shape by the image processing. The primitive shape mentioned here is a simple geometrical shape, such as a cylinder, a polygonal prism, a circular cone, a polygonal pyramid, etc., for example. FIG. 11 illustrates an example in which a graspable part of a mug is replaced by a cylinder.

In step S806 in the flowchart illustrated in FIG. 8A, a comparison is made between a primitive shape and a graspable size of the grasping section. If the primitive shape is smaller than the graspable size of the grasping section, a determination is made that the graspable part of the object is graspable.

Figure 12:
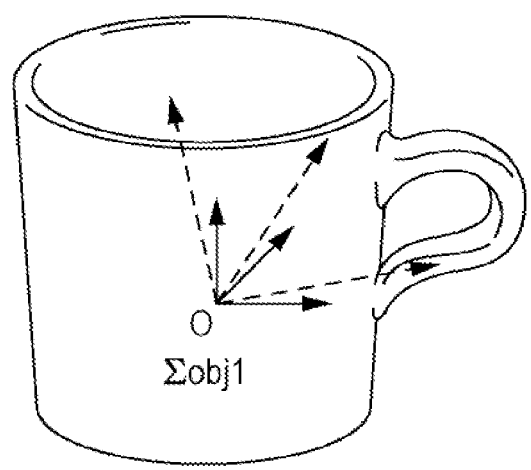
FIG. 12 is a diagram illustrating a state in which the grasping coordinate system Σhd given to the grasping section of the robot apparatus is overlaid on the grasp object coordinate system Σobj1 given to the graspable part of the mug.

Also, FIG. 12 illustrates a state in which the grasping coordinate system Σhd given to the grasping section of the of the robot apparatus 100 is overlaid on the grasp object coordinate system Σobj1 given to the graspable part of the mug. In step S808 in the flowchart illustrated in FIG. 8A, if it is possible to make the grasp object coordinate system Σobj1, or a hand-over vector described later, and each element vector (x, y, z) of the grasping coordinate system Σhd not greater than a posture value given to the mug, a determination is made that the graspable part is graspable in a good posture.

Figure 13:
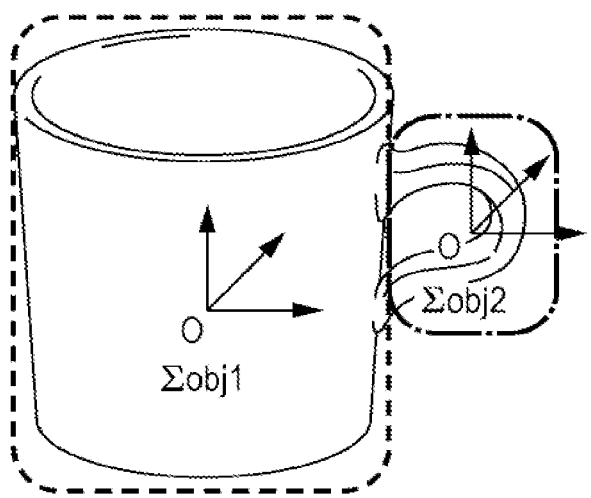
FIG. 13 is a diagram illustrating a state in which a grasp object coordinate system Σobj2 is given to a handing-over area part of a mug, which is an object to be grasped.

Also, FIG. 13 illustrates a state in which a grasp object coordinate system Σobj2 is given to a handing-over area part of a mug, which is an object to be grasped. In step S811 in the flowchart illustrated in FIG. 8A, if it is possible to make the grasp object coordinate system Σobj2, or the hand-over vector described later, and each element vector (x, y, z) of the grasping coordinate system Σhd not greater than a posture value given mug, a determination is made that the handing-over area part is graspable in a good posture.

Also, if the robot apparatus 100 recognizes an image of a palm of a user who is a recipient of the object from the image captured by the camera 321, the robot apparatus 100 gives the handing-over coordinate system Σrv to a center point thereof. However, if a sensor capable of detecting a posture, such as a gyroscope, etc., is attached to the palm of the user, it is possible to give the handing-over coordinate system Σrv on the basis of a sensor value thereof.

Figure 14:
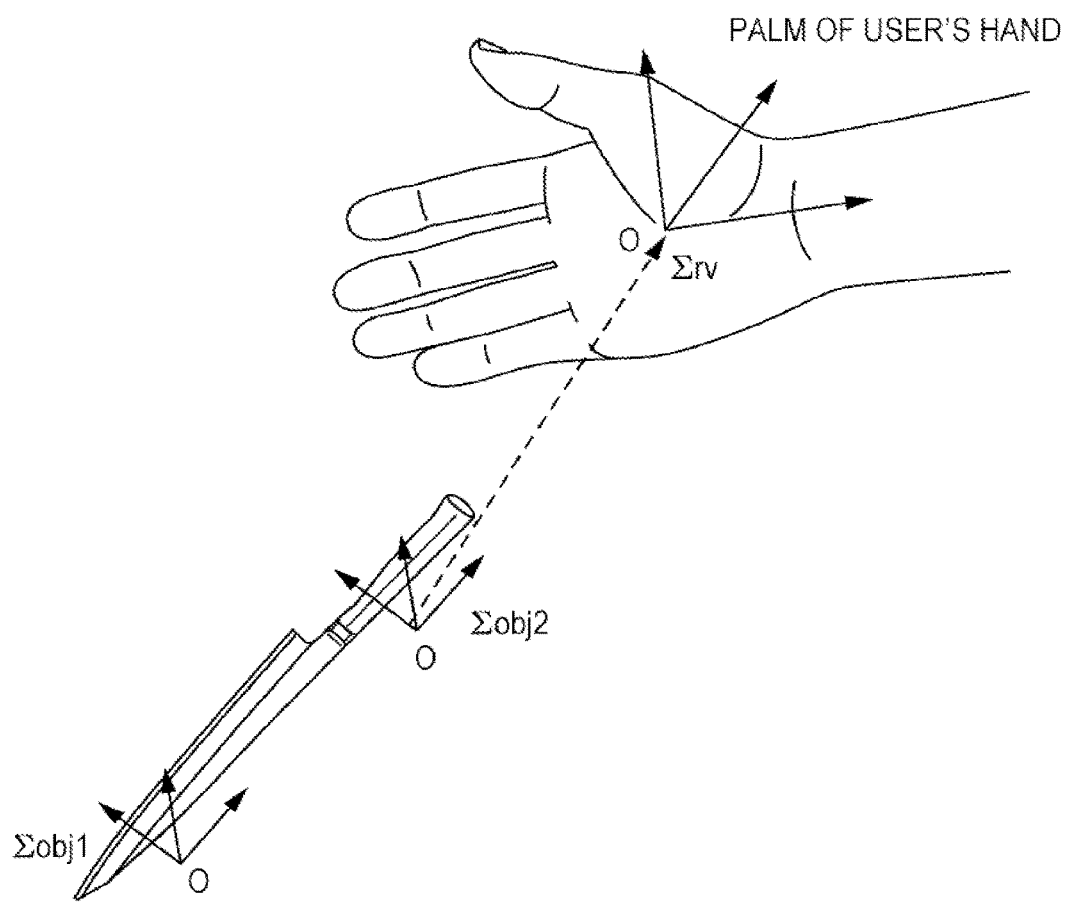
FIG. 14 is a diagram illustrating a relationship between a handing-over coordinate system Σrv given to a palm of a user's hand, and grasp object coordinate systems Σobj1 and Σobj2 given to a graspable part and a handing-over area part, respectively, of a knife which is an object to be handed over.

At the time of carrying out the handing over of the object, the robot apparatus 100 hands over the object in a manner that is close to a vector formed by a vector given to the grasp object coordinate systems Σobj1 or Σobj2 (Σobj1 in the case of grasping the object by the graspable part, whereas Σobj2 in the case of grasping the object by the handing-over area part) and the handing-over coordinate system Σrv. FIG. 14 illustrates a relationship between a handing-over coordinate system Σrv given to a palm of a user, and grasp object coordinate systems Σobj1 and Σobj2 respectively given to a graspable part and a handing-over area part of a knife, which is an object to be handed over.

Figure 15:
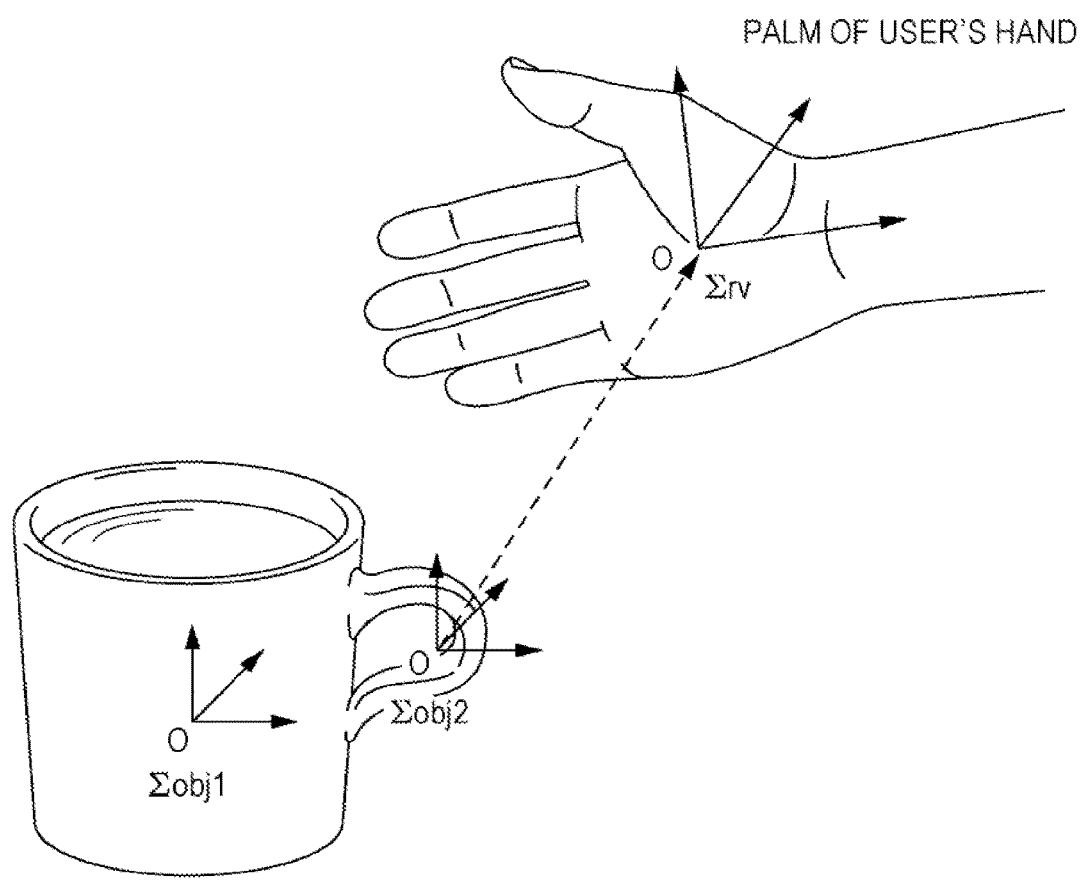
FIG. 15 is a diagram illustrating a relationship between a handing-over coordinate system Σrv given to a palm of a user's hand, and grasp object coordinate systems Σobj1 and Σobj2 given to a mug which is an object to be handed over.

Also, FIG. 15 illustrates a relationship between a handing-over coordinate system Σrv given to given to a palm of a user, and grasp object coordinate systems Σobj1 and Σobj2 given to a mug, which is an object to be handed over. If an object to be handed over is a mug, and the mug contains drink, it is necessary to add a restrictive condition that the mug should be kept horizontal during handing-over operation, that is to say, the grasp object coordinate system should be kept constant, which is different from the case of a pen. As illustrated in FIG. 15, for such an object, a "hand-over vector" indicating a direction of handing over the object and a "vertical direction vector" indicating a vertical direction of the object are given to the grasp object coordinate system Σobj1. And handing over is carried out in a posture determined by the hand-over vector and the vertical direction vector regardless of the handing-over coordinate system Σrv. The hand-over vector may be one vector, a plurality of vectors, or face definition may be made.

Figure 16:
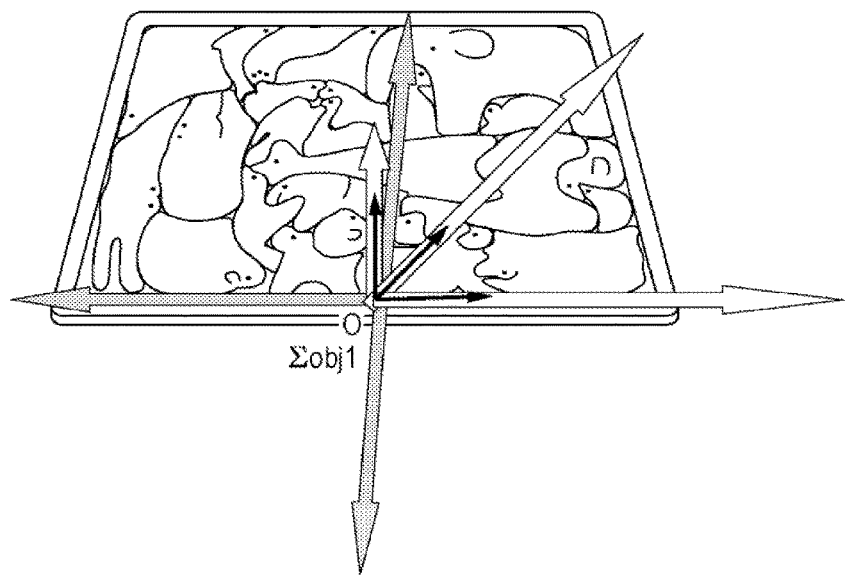
FIG. 16 is a diagram illustrating a state in which a grasp object coordinate system Σobj1 is given to a puzzle, which is an object that makes it necessary to maintain a posture while handing-over operation is performed.
Figure 17:
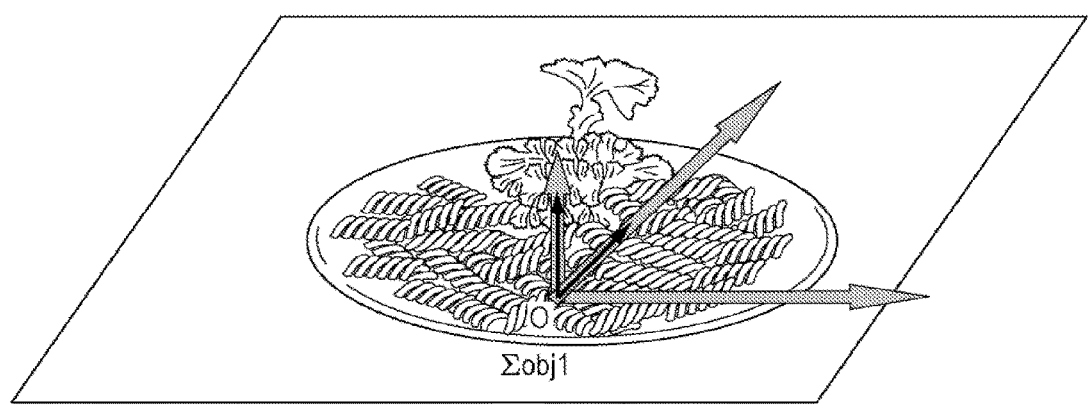
FIG. 17 is a diagram illustrating a state in which a grasp object coordinate system Σobj1 is given to a plate full of dishes, which is an object that makes it necessary to maintain a posture while handing-over operation is performed.

Also, another examples of the case where it is necessary to keep posture of an object while the handing-over operation is performed may include a puzzle (refer to FIG. 16), and a plate on which food is served (refer to FIG. 17). FIGS. 16 and 17 illustrate a state in which a grasp-object coordinate system Σobj1 is given. In the case of the puzzle, it is necessary that the vertical direction is correct, horizontal condition is kept, and the hand-over direction is a certain direction, and thus a plurality of hand-over vectors are given. On the other hand, in the case of the plate on which food is served, as long as the vertical direction is correct, and horizontal condition is kept, it is sufficient, and thus hand-over vectors that define faces are given, and handing over is carried out in the vector posture irrelevantly to the handing-over coordinate system Σrv.

As already described, area information on a graspable part for each object category, a handing-over area part, and an ungraspable part is put into a database. In this database, an origin position and posture of the grasping coordinate system given to each area, an area range, a hand-over vector are stored for each object category in addition to the area information. As in the case of a glass with drink, in the case of an object that is necessary to determine handing-over posture irrelevantly to the handing-over coordinate system Σrv of the user, hand-over vectors are necessary.

Figure 18:
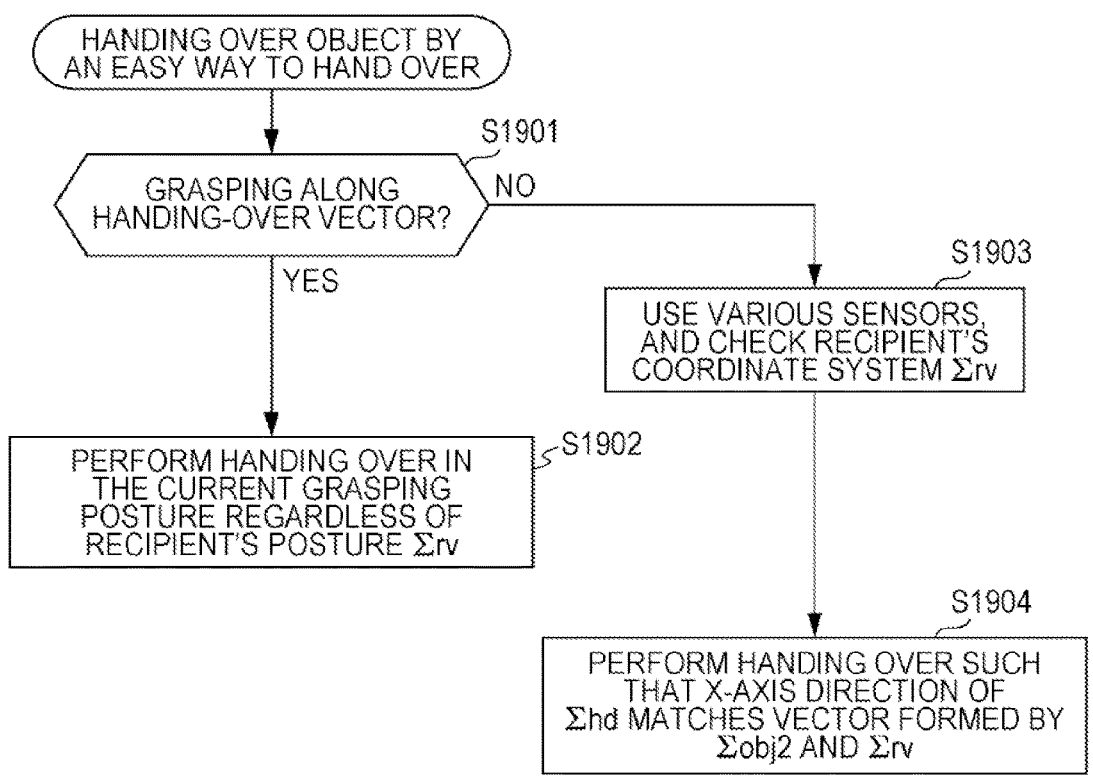
FIG. 18 is a flowchart illustrating a processing procedure for handing over an object to a user by an easy way to hand over.

FIG. 18 illustrates, in a flowchart form, a processing procedure for handing over an object to a user by an easy way to hand over using a grasping coordinate system and a hand-over vector for each area set on the object in step S810 in the flowchart illustrated in FIG. 8A.

First, a determination is made whether the robot apparatus 100 is grasping an object along the hand-over vector (step S1801).

Here, if the robot apparatus 100 is grasping the object along the hand-over vector (Yes in step S1801), the robot apparatus 100 performs handing-over operation while maintaining the current grasping posture irrelevantly to the handing-over coordinate system Σrv of the user, who is a recipient (step S1802).

On the other hand, if the robot apparatus 100 is not grasping the object along the hand-over vector (No in step S1801), the robot apparatus 100 confirms the handing-over coordinate system Σrv of the user, who is the recipient (step S1803). The robot apparatus 100, for example, recognizes an image of a palm of the user, who is the recipient, from the image captured by the camera 321, and confirms the handing-over coordinate system Σrv at the center point thereof. Alternatively, if the robot apparatus 100 recognizes a palm of the user, who is the recipient, from the image captured by the camera 321, the robot apparatus 100 confirms the handing-over coordinate system Σrv at a center point thereof.

And robot apparatus 100 hands over the object such that an X-axis direction of the grasping coordinate system Σhd of the grasping section (that is to say, the handing-over direction vector) matches a vector formed by the grasp object coordinate system Σobj2 of the object (handing-over area part) and the handing-over coordinate system Σrv of the user (step S1804).

In this manner, by the present embodiment, it is possible to achieve object handing-over interaction from the robot apparatus 100 to a person safely and efficiently in consideration of easiness of receiving by a recipient of an object. Also, if determined that it is difficult to hand over an object, it is possible for the robot apparatus 100 to reduce uncomfortable feeling given to a recipient by informing the recipient of that in advance.

In this regard, it is possible to configure the technique disclosed in this specification as follows.

(1) A robot apparatus including: a grasping section configured to grasp an object; a recognition section configured to recognize a graspable part and a handing-over area part of the object; a grasp planning section configured to plan a path of the grasping section for handing over the object to a recipient by the handing-over area part; and a grasp control section configured to control grasp operation of the object by the grasping section in accordance with the planned path.

(2) The robot apparatus according to (1), further including an imaging section, wherein the recognition section is configured to recognize the graspable part and the handing-over area part of the object on the basis of an image recognition result of a captured image of the object by the imaging section.

(3) The robot apparatus according to (1), wherein the recognition section is configured to recognize a part enabling a user who receives the object to easily receive the object as the handing-over area part, and recognize a part allowed to be grasped by the grasping section, but difficult for the user to receive as the graspable part on the basis of an image recognition result of a captured image of the object by the imaging section.

(4) The robot apparatus according to (3), wherein the recognition section is configured to further recognize a part of the object not allowed to be held by the grasping section as an ungraspable part.

(5) The robot apparatus according to (1), wherein the grasp planning section is configured to plan a path of the grasping section for handing over the object to the recipient by grasping the object by the graspable part, and handing over the object by the handing-over area part.

(6) The robot apparatus according to (5), wherein if the grasp planning section fails to plan a path of the grasping section for handing over the graspable part of the object in a good posture, the grasp planning section is configured to plan a path of the grasping section for changing to hold the graspable part of the object in a good posture, and then to hand over the object to the recipient by the handing-over area part.

(7) The robot apparatus according to (5), wherein if the grasp planning section fails to plan a path of the grasping section for handing over the graspable part of the object in a good posture, the grasp planning section is configured to plan a path of the grasping section for grasping the object by the handing-over area part, and then changing to hold the graspable part of the object in a good posture, and then handing over the object by the handing-over area part.

(8) The robot apparatus according to (5), wherein if the grasp planning section fails to grasp the graspable part of the object in a good posture, the grasp planning section is configured to plan a path of the grasping section for grasping the object by the handing-over area part, and handing over the object to the recipient by the graspable part.

(9) The robot apparatus according to (6) or (7), wherein when the grasp planning section fails to grasp the graspable part of the object in a good posture even if changing to hold the object, the grasp planning section is configured to plan a path of the grasping section for grasping the object by the handing-over area part, and handing over the object to the recipient by the graspable part.

(10) The robot apparatus according to (8) or (9), wherein the grasp planning section is configured to give a warning to the recipient to whom the object is handed over by the graspable part.

(11) The robot apparatus according to any one of (5) to (9), wherein if the grasp planning section fails to plan a path of the grasping section for handing over the object either by the handing-over area part or by the graspable part, the grasp planning section is configured to give a warning of being unable to hand over the object to the recipient.

(12) A method of controlling a robot apparatus, including: recognizing a graspable part and a handing-over area part of an object to be grasped by a grasping section; grasp planning a path of the grasping section for handing over the object to a recipient by the handing-over area part; and controlling grasp operation of the object by the grasping section in accordance with the planned path.

(13) A computer program described in a computer-readable format for causing a computer to function as an apparatus including: a recognition section configured to recognize a graspable part and a handing-over area part of an object to be grasped by a grasping section; a grasp planning section configured to plan a path of the grasping section for handing over the object to a recipient by the handing-over area part; and a grasp control section configured to control grasp operation of the object by the grasping section in accordance with the planned path.

In the above, the detailed description has been given of the technique disclosed in this specification with reference to the specific embodiment. However, it is apparent that modifications and substitutions of the embodiment may be made by those skilled in the art without departing from the spirit and scope of the technique disclosed in the present specification.

In short, a description has been given of the technique disclosed in this specification by exemplification. However, the description of this specification should not be construed in a limited manner. In order to determine the gist of the technique disclosed in this specification, the appended claims should be considered.

The present application is a continuation of U.S. patent application Ser. No. 13/781,877 filed on Mar. 1, 2013 which claims priority of the Japanese Patent Application No. 2012-053108 filed in the Japan Patent Office on Mar. 9, 2012, the entire contents of which are incorporated herein by reference.

What is claimed is:

1. An apparatus, comprising:
an imaging section configured to capture an image of an object; and
a holding section configured to hold the object;
circuitry configured to:
recognize a first part of the object and a second part of the object, wherein the second part of the object is recognized as a part of the object by which the object is handed over to a user;
cause the holding section to hold the first part of the object, based on the image of the object;
detect a palm of the user based on an image of the palm of the user;
determine a first path of the holding section based on a relationship between a first vector of a first coordinate system of the holding section and a second vector of a second coordinate system of the palm of the user, wherein the first path is determined to hand over the object to the user by the second part of the object; and
control hold operation of the object by the holding section based on the first path.

2. The apparatus according to claim 1, wherein the circuitry is further configured to
recognize the first part of the object and the second part of the object, based on an image recognition result of the captured image of the object.

3. The apparatus according to claim 2, wherein the circuitry is further configured to:
recognize the part that enables the user who receives the object to receive the object as the second part of the object, and recognize a part that is allowed to be held by the holding section as the first part of the object, based on the image recognition result.

4. The apparatus according to claim 3, wherein the circuitry is further configured to recognize a third part of the object that is restricted to be held by the holding section as an unholdable part.

5. The apparatus according to claim 1, wherein the circuitry is further configured to
control the holding section to hold the object by the first part of the object, and to hand over the object by the second part of the object, based on the first path.

6. The apparatus according to claim 5, wherein the circuitry is further configured to
determine a second path to hold the first part of the object based on a determination that the holding section is unable to handover the first part of the object in a determined posture according to the first path.

7. The apparatus according to claim 5, wherein the circuitry is further configured to
determine a second path to hold the object by the second part of the object, and
change the second path to hold the first part of the object in a determined posture, and to hand over the object by the second part of the object.

8. The apparatus according to claim 5, wherein the circuitry is further configured to,
determine a second path to hold the object by the second part of the object, and to hand over the object to the user by the first part of the object.

9. The apparatus according to claim 6, wherein the circuitry is further configured to
determine a third path to hold the object by the second part of the object, and to hand over the object to the user by the first part of the object.

10. The apparatus according to claim 8, wherein the circuitry is further configured to
generate a warning to the user to whom the object is handed over by the first part of the object.

11. The apparatus according to claim 5, wherein the circuitry is further configured to:
generate, based on a determination that the holding section is unable to hand over the object by one of the first part or the second part, a warning that the apparatus is unable to hand over the object to the user.

12. A method of controlling an apparatus, the method comprising:
capturing an image of an object;
recognizing a first part of the object and a second part of the object, wherein the second part of the object is recognized as a part of the object by which the object is handed over to a user;
causing a holding section of the apparatus to hold the first part of the object, based on the image of the object;
detecting a palm of the user based on an image of the palm of the user;
determining a path of the holding section based on a relationship between a first vector of a first coordinate system of the holding section and a second vector of a second coordinate system of the palm of the user, wherein the path is determined to hand over the object to the user by the second part of the object; and controlling hold operation of the object by the holding section based on the path.

13. A non-transitory computer-readable medium having stored thereon computer-readable instructions, which when executed by a computer, cause the computer to execute operations, the operations comprising:

in an apparatus:

capturing an image of an object;

recognizing a first part of the object and a second part of the object, wherein the second part of the object is recognized as of the object by which the object is handed over to a user;

causing a holding section of the apparatus to hold the first part of the object, based on the image of the object;

detecting a palm of the user based on an image of the palm of the user;

determining a path of the holding section based on a relationship between a first vector of a first coordinate system of the holding section and a second vector of a second coordinate system of the palm of the user, wherein the path is determined to hand over the object to the user by the second part of the object; and controlling hold operation of the object by the holding section based on the path.

* * * * *